(12) United States Patent
Genthon et al.

(10) Patent No.: US 9,469,241 B2
(45) Date of Patent: Oct. 18, 2016

(54) ELECTRIC LAMP HAVING AN AUTOMATIC LIGHT REGULATION

(71) Applicant: Zedel S.A., Crolles (FR)

(72) Inventors: Fabien Genthon, Crolles (FR); Romain Pellat-Finet, Grenoble (FR)

(73) Assignee: Zedel S.A., Crolles (FR)

( * ) Notice: Subject to any disclaimer, the term of this patent is extended or adjusted under 35 U.S.C. 154(b) by 442 days.

(21) Appl. No.: 14/023,804

(22) Filed: Sep. 11, 2013

(65) Prior Publication Data

US 2014/0070700 A1  Mar. 13, 2014

(30) Foreign Application Priority Data

Sep. 11, 2012  (FR) ..................................... 12 02417

(51) Int. Cl.
- *H05B 33/08* (2006.01)
- *B60Q 1/14* (2006.01)
- *H05B 37/02* (2006.01)

(52) U.S. Cl.
CPC ......... *B60Q 1/1423* (2013.01); *H05B 33/0854* (2013.01); *H05B 37/0218* (2013.01); *H05B 37/0227* (2013.01); *Y02B 20/46* (2013.01)

(58) Field of Classification Search
None
See application file for complete search history.

(56) References Cited

U.S. PATENT DOCUMENTS

| | | | |
|---|---|---|---|
| 6,659,618 B2* | 12/2003 | Waters | F21V 21/084 362/105 |
| 7,410,271 B1 | 8/2008 | Man | |
| 8,159,155 B2 | 4/2012 | Deurenberg et al. | |
| 8,203,581 B2* | 6/2012 | Garcia | H05B 33/0854 315/149 |
| 8,258,707 B2 | 9/2012 | Van Der Veen et al. | |
| 8,376,948 B2 | 2/2013 | Brannan | |
| 8,378,587 B2 | 2/2013 | Huguenin et al. | |
| 8,529,086 B2 | 9/2013 | Skrivan et al. | |
| 2004/0211888 A1 | 10/2004 | Shur et al. | |
| 2005/0099798 A1 | 5/2005 | Cugini et al. | |
| 2007/0291488 A1* | 12/2007 | Heathcock | H05B 37/0272 362/276 |
| 2008/0297066 A1 | 12/2008 | Meijer et al. | |
| 2010/0117543 A1 | 5/2010 | Van Der Veen et al. | |
| 2010/0194293 A1 | 8/2010 | Deurenberg et al. | |
| 2011/0031901 A1 | 2/2011 | Huguenin et al. | |
| 2012/0211779 A1 | 8/2012 | Yamamoto | |
| 2012/0275140 A1 | 11/2012 | Feinbloom et al. | |
| 2015/0036324 A1* | 2/2015 | Fitzgerald | A42B 1/242 362/106 |

FOREIGN PATENT DOCUMENTS

| | | |
|---|---|---|
| EP | 1734502 | 12/2006 |
| EP | 2489321 | 8/2012 |
| EP | 2490258 | 8/2012 |
| EP | 2498583 | 9/2012 |
| FR | 2930706 | 10/2009 |
| WO | WO2007069149 | 6/2007 |
| WO | WO2008129453 | 10/2008 |
| WO | WO2009013698 | 1/2009 |
| WO | WO2009133309 | 11/2009 |
| WO | WO2012119754 | 9/2012 |
| WO | WO2012119756 | 9/2012 |

OTHER PUBLICATIONS

French Search Report Mailed: Feb. 13, 2013.

* cited by examiner

*Primary Examiner* — Dedei K Hammond
(74) *Attorney, Agent, or Firm* — Saile Ackerman LLC; Stephen B. Ackerman

(57) ABSTRACT

A portable lamp, such as a headlamp is presented. The lamp contains
- a light source comprising one or more sources for generating at least one light beam;
- a means for controlling the brightness of said at least one beam in response to a control information or a control signal; and
- a control unit for the purpose of generating said control information or said control signal.

The control unit contains a photo sensor and a regulation circuit controlling a switch-off phase of one or more beams during a period not visible to the holder of the lamp. The switch off phase being combined with at least one measure of diversity made by means of the photo sensor(s) on the reflective ambient environment.

20 Claims, 6 Drawing Sheets

ELECTRIC LAMP HAVING AN AUTOMATIC LIGHT REGULATION

TECHNICAL FIELD

The present invention relates to the field of portable electric lamps including a portable electric lamp with an automatic lighting control.

BACKGROUND

The Applicant of the present application has marketed a portable lamp, of the type headlamp, with a so-called "reactive" or "dynamic" lighting which is described in patent application WO2009/133309. Briefly, as illustrated in prior art FIG. 1, there is a headlamp having at least one light emitting diode 15 and a LED type optical sensor 14 located in the vicinity and for sensing a signal representative of the light reflected by the surface of an object illuminated by the lamp 16. A control circuit 13 processes the signal for the purpose of automatically controlling the power of the LED according to a predetermined threshold. In this way, an automatic adjustment of the light beam emitted by the lamp can be achieved without any manual action to adapt the light to the environment, while managing energy consumption.

The principle of this light "dynamic" is clearly a significant improvement brought in field of headlamps, and more generally portable lighting.

However, despite the significant advantages which are therefrom resulting, such headlamp has shown new problems.

Indeed, a high sensitivity of the control system to the disturbing light sources actually has been actually observed.

For example if the user illuminates a scene in the distance and an object—even a small one—causes a reflected portion of the light produced by the lamp to interfere with the control system, the latter might be disturbed and causes a reduction of the light emission power, even if it is not required nor desirable.

In a second example, one has noticed a disturbance in the light regulation when the holder of the lamp is walking on a road and comes to cross the lights of a vehicle traveling in the opposite direction. In this case, as previously, the control system is spoiled by the interfering light produced by the vehicle lights and once again inappropriately reduce the brightness of the lamp.

Finally, one can also evoke a third example—that of a climber on the rope—whose dynamic lighting might be disturbed by the rope moving right and left in front of the photosensor.

A solution to this problem is described in two patent applications PCT/EP2012/000982 and PCT/EP2012/000984, both filed Mar. 6, 2012 by the assignee of this patent application and unpublished at the time of filing this application. This solution requires the use of an image sensor associated to a image process which can process images so as to allow a more sophisticated control, either of the brightness of the LEDs or of the geometry of the light beam.

Those solutions however require a more sophisticated architecture which significantly increases the manufacturing costs of those headlamps.

SUMMARY OF THE INVENTION

The problem to solve is to propose a dynamic or reactive lamp which still is cheap to manufacture.

It is an object of the present invention to carry out an economic headlamp equipped with an advanced control mechanism to improve efficiency and comfort for the lamp holder.

It is another object of the present invention to provide an improved method for controlling the light intensity of a headlamp in order to increase the ease of use of the lamp while rendering the regulation less sensitive to the parasitic light sources.

It is another object of the present invention is to provide a headlamp having new functionalities and which can be used in a wide number of applications.

The invention achieves these goals by means of a portable lamp comprising:
  a light source comprising one or more sources for generating at least one light beam;
  means for controlling the brightness of said beams in response to a control information or control signal;
  a control unit for generating said control information or said control signal;
  wherein said control unit comprises at least one photo sensor and a control circuit controlling a phase of switch-off of one or more beams for a period not visible by the carrier of the lamp, said switch-off phase being combined with at least a diversity measure of the ambient reflection performed by the at least one photo sensor.

Preferably, the light source are low consumption LED diodes

In one embodiment, the lamp has a single photo sensor and a single beam.

However, in a preferred embodiment, the lamp has a single photo sensor and two beams respectively Wide and Narrow.

In particular, the control circuit causes periodically:
  Extinction of the Narrow beam, together with a first measurement made by the photo sensor;
  Extinction of the Wide beam, together with a second measurement made by the photo sensor.

Preferably, the control circuit performs the calculation of the ambient brightness in accordance with the formula:

$$L_{ambient} = M2 + M3 - M1$$

With
M1 being a measure performed when both beams are on;
M2 being a measure performed during the switch-off of the Narrow beam;
M3 being a measure performed during the switch-off of the Large beam.

Various control strategies can be considered.

In a first embodiment, the control circuit adjusts the power of the light beam based on only values of $L=M1-M3$ and $E=M1-M2$, excluding the intervention of the ambient light. In this way, it is possible to avoid disturbance resulting from the ambient light (car lights for example).

Alternatively, one can arrange, for example in accordance with a configuration settings of the lamp, to adjust and control the power of the lamp only on the basis of the sole value $L_{ambient}$.

In other embodiments, the two beams can be misaligned.

Preferably, the lamp will also include configuration means, especially after in accordance with one or more predetermined profiles, the configuration being performed by means of a USB port allowing communication with a computer, a touch pad or smartphone.

Finally, according to one aspect of the invention, the beam or beams may be advantageously modulated so as to facilitate more the distinction between the light beams.

BRIEF DESCRIPTION OF THE DRAWINGS

Other features, objects and advantages of the invention will become apparent upon reading the following description and drawings below, given by way of non-limiting examples. In the accompanying drawings.

DESCRIPTION

It will now be described how one can significantly improve the operation of a reactive or dynamic lamp, based on a photo sensor of the type mono-sensor. Generally speaking, the term mono-sensor designates any sensor that is capable of generating an analog or digital elementary information, at the exclusion of a image sensor which generates an information structure into a matrix of pixel information.

The photo sensor shows clearly the advantage, with respect to an image sensor, of achieving a realization with low manufacturing costs.

Clearly, one will more particularly consider the example of a portable lamp, such as a headlamp or any other mobile device fitted with an autonomous lighting system.

According to one aspect of the invention, the headlamp has a set of photo sensors n (n>=1) and m light beams (m>=1) which, if any, may contain one or more beams having possibly different brightness and geometry.

According to one aspect of the present invention, the lamp has a control mechanism based on periodic extinction, for a duration not perceptible to the user, of one or more beams together with the measurement by the sensor(s), during such periodical extinction, of the reflecting ambient environment.

The measurements which are performed within the portable lamp, in different configurations and lighting situations, lead to the collection of a diversity of information relating to the reflective ambient environment and therefore allows a finer knowledge of the "response" of such reflective ambient environment.

With the result that it becomes possible to carry out a strategy of control of the brightness of the lamp, being much more sophisticated than ever.

To illustrate the various possibilities of implementation of the new solution which is proposed, one will describe different embodiments:

an embodiment comprising a single photo sensor with a single beam;
an embodiment comprising a single photo sensor, together with two beams, narrow and wide, respectively.

1. Description of a First Embodiment (Single Photo Sensor; Single Beam)

Figure 2:
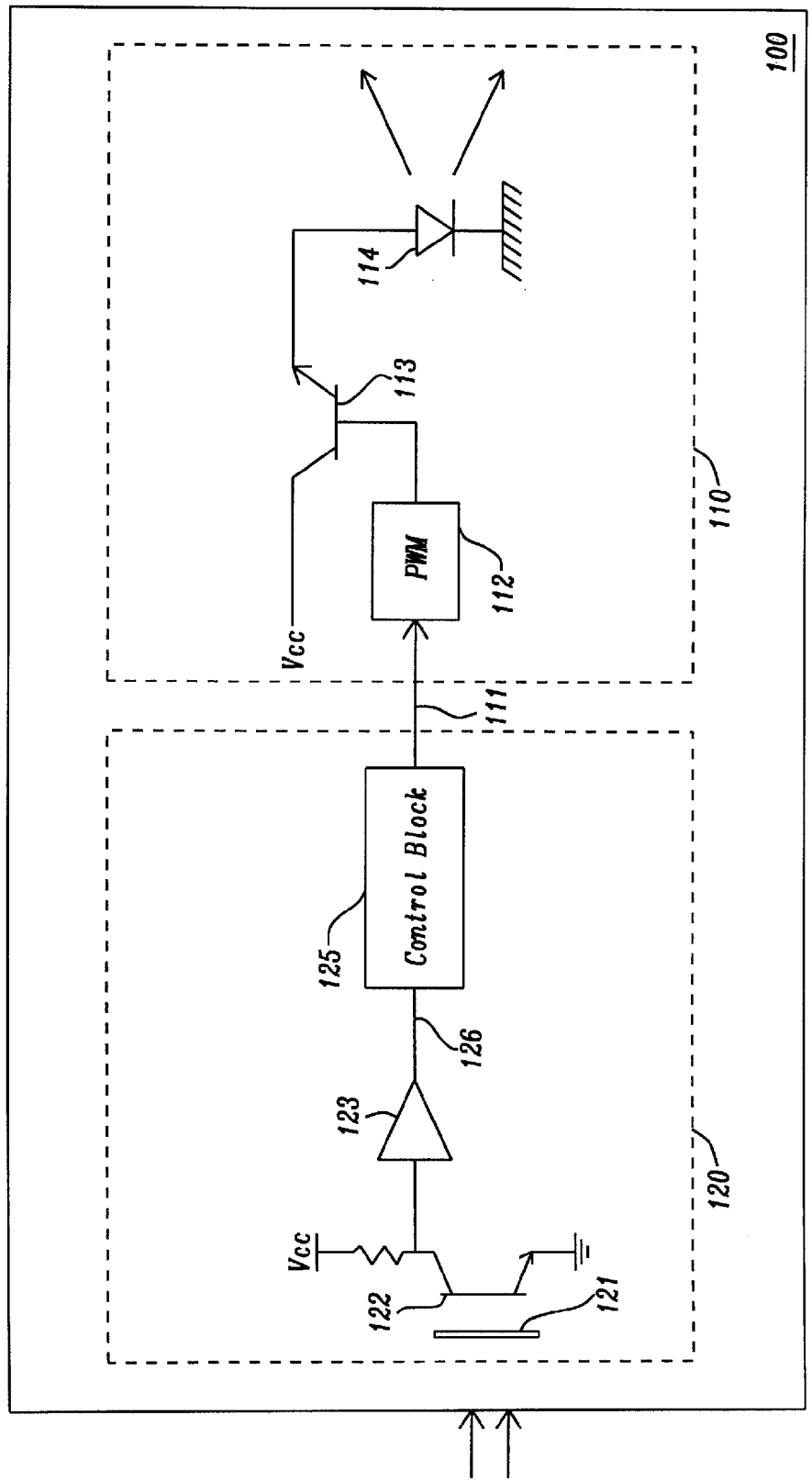
FIG. 2 illustrates a synoptic view of a first embodiment, comprising a photo sensor and one light beam.

FIG. 2 more particularly illustrates a headlamp 100 comprising one single photo sensor combined to one single light beam, produced by any light source (bulb, LED, OLED etc. . . . )

One notices that lamp 100 includes a power unit 110 associated with a control unit 120.

The power unit 110 specifically includes all components that are conventionally found in a LED lamp for producing a light beam having a high intensity.

The circuit comprises a power supply such as a battery (not shown) generating a supply voltage Vcc, one or more LEDs (a single LED 114 being shown in the Figure for generating a single beam) being powered by a power switch 113 of the type semiconductor, such as a bipolar transistor, a FET (Field Effect Transistor) or MOSFET (Metal oxide Semiconductor). In order to reduce the Joule losses, switch 113 is controlled by means of a Pulse Width Modulation (PWM) well known to the skilled and similar that which is known in the Class D audio circuits. This modulation is generated by means of a PWM circuit 112 which is itself controlled, on its input 111, by a control signal.

Generally speaking, the components that compose power unit 110—switches and circuits—are well known to those skilled in the art and the description will be deliberately limited for the sake of conciseness. Similarly, the reader is referred to the general literature on various aspects of the PWM modulation.

It should be further noted that the embodiment being described, based on a pulse width modulation, is only one non-limiting example of an embodiment, and that the latter may be replaced, or combined by/with any other power circuit based on the use of voltage converters of the type "buck" or "boost" converters, well known to a skilled man, so as to generate the adequate voltage levels used for powering LED diodes.

A control unit 120 generates the control signal transmitted to the input 111 of the power unit 110 in order to control PWM circuit 112 and thus control the intensity of light produced by the LEDs.

Figure 1:
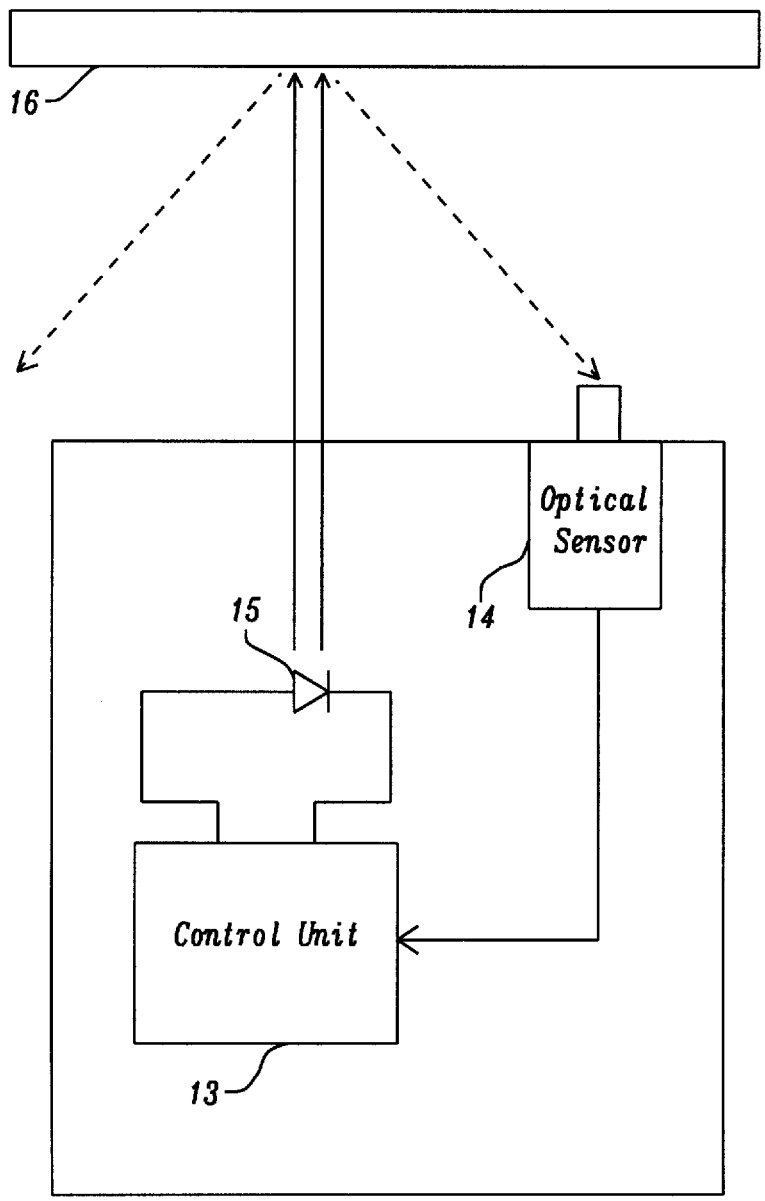
FIG. 1 illustrates the general architecture of a prior art conventional dynamic lighting lamp.

The control module includes a sensor 122 located behind optical system 121, which sensor 122 has optionally appropriate optics for focusing the reflected light signal to be sensed. FIG. 1 illustrates the use of a photo sensor that is electrically mounted in Common Emitter, providing a first voltage gain but it is clear for a skilled man that is is only one non-limiting example of an embodiment. Alternatively, one may use other circuits for sensing focused by the optics 121. In a particular embodiment, one captures the radiation within a cone having an angle of the order of 10 to 20 degrees around the lamp axis or the axis of the photosensor 122.

It should be further noticed, and this is an advantage of the present invention, that the improvement of the control system which will be described later, can significantly increase the value of the cone angle, so as to make the capture of reflected light less sensitive to local objects.

In a particular embodiment, the sensor may be a sensor arranged within an integrated circuit, based on a crystalline component that generates a surface electric charge when exposed to light radiation. A variation of light received by the sensor causes a variation of the surface electric charge, which can be measured by means of a field effect amplifier (Field Effect Transistor) for example, or any appropriate circuitry.

In general, the signal captured by the sensor 122 is transmitted to a amplification circuit 123 providing, at the same time, adequate amplification of the signal but also appropriate filtering to condition such signal, and only retain the useful frequencies that are devoid of noise components. In particular, it should be noted that the sensor is sensitive to a wide range of frequencies and it will be possible, in one particular embodiment, to filter the sensed signal so as to retain only the desired frequencies.

The amplifier circuit 123 thus generates an amplified analog component of the radiation sensed by element 122, which component is forwarded via a terminal 126 to a control block 125 that is capable of processing this signal in order to generate the control signal transmitted to input lead 111 of PWM unit 112.

The control unit 125 may be carried out in many ways.

In a particularly simple embodiment, the control unit 125 may be carried out using analog components to generate the control signal 111.

Figure 3:
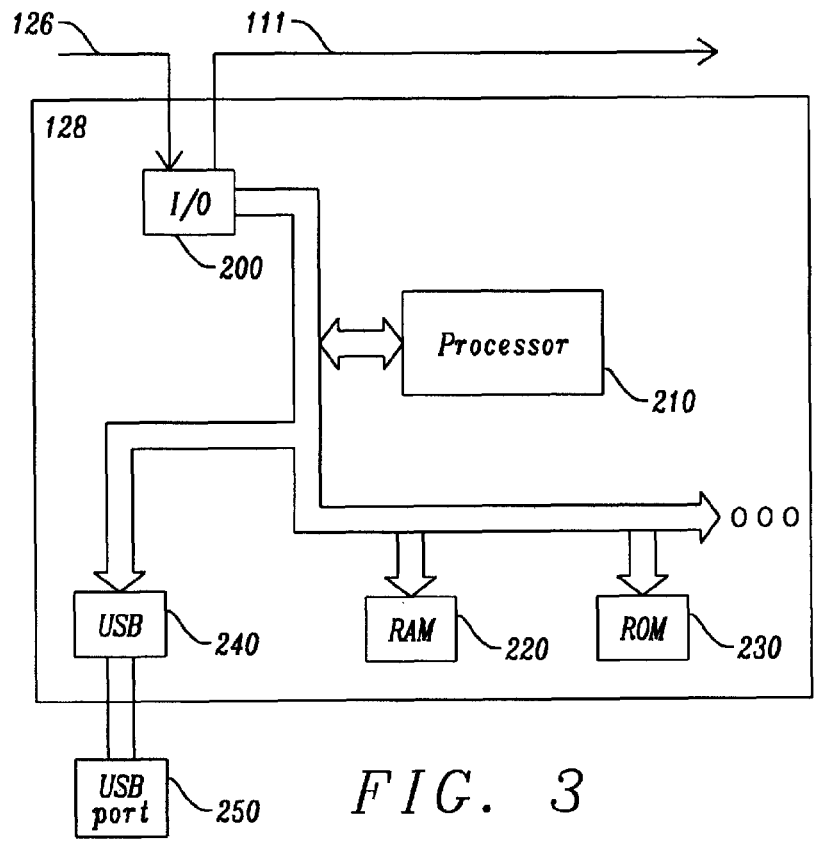
FIG. 3 shows an alternative embodiment of the embodiment of FIG. 2, which comprises a microprocessor based architecture.

Alternatively, one may directly consider the use of a microprocessor based architecture as illustrated in FIG. 3, showing a control circuit—referenced 128—comprising a processor CPU 210 (Central Processing Unit) having access to RAM memory 220, to Read Only Memory (ROM) or Electrically Erasable Programmable Read Only Memory (EEPROM) memory via conventional address, data and control bus for the storage of instructions and micro programs, as well as an input/output module 200 for the interfacing with the external signals, among which the output signal of the amplifier 123 on terminal 126 and also the control signal of module controlling the PWM circuit via lead 111.

Optionally, control unit 128 may have USB (Universal Serial Bus) module 240 allowing the exchange of data via a serial interface 250 complying with the Standard.

In this way, the control unit is able to communicate with a data processing device such as a computer or laptop.

Such communication shows to be especially useful for exchanging configuration data, such as "profiles" allowing the storage, as needed, of settings and adjustment parameters of the lamp in accordance with the particular use wished by the user. In particular, the safety function may be de activated through the interface of the lamp via the USB port.

Incidentally, the USB connection to a computer can also be used to recharge the battery supplying power to the lamp.

In addition to the processor 210, RAM 220 and ROM 230, control unit 128 can include various electronic circuits, such as buffer elements, counters circuits, branch registers well known to those skilled in the art, and which will not be described with more details.

As it can be seen, control unit 128 shows quite a more sophisticated structure for generating control signal 111 than the basic form which was described in relation with FIG. 2. In general, it should be noted that the term "signal" mentioned above refers to an electrical quantity—current or voltage—used for controlling the power unit, and in particular the PMW modulation used for powering LED diode 114. This is however only a non limiting example, and it is possible to replace the "control signal 111" by a "control information", eg logical information that can be stored in a register (result of the computing performed by processor 210) and transmitted by any appropriate means to power unit 110 so as to control the emission power of the light beam. In one particular embodiment, one may even consider to integrate within a single module or integrated circuit the control unit and the power unit.

One man skilled in the art will readily understand, therefore, that when we refer to a "control signal 111", one equally encompasses the embodiments based on an electric control variable—current or voltage—as well as embodiments in which the control is performed by means of a logic information conveyed to the power unit. For this reason, we will discuss below indiscriminately control signal or control information.

Control unit 125 of the lamp shown in FIG. 2 operates as follows: Periodically, the control unit causes the extinction of the sole light beam produced by LED 114 and performs a first measure M1 being representative of the ambient light $L_{ambient}$. Then, the control unit performs a second measurement M2 performed during the lighting of the LED so as to obtain a new information that, in essence, will determine the amount of reflected light R resulting from the light beam from the LED 114, in accordance with the following formula:

$$R=M2-M1$$

In this way, one can obtain a more accurate information than the one obtained in a conventional manner with the conventional lamp (in which the measurement was performed without switching off the LEDs) since it yields a representation of the ambient light and especially the specific response of the lamp to the light generated by the LED 114.

Such information is very useful for improving the regulation and control strategy of the control circuit 125. In particular, one may decide, and this is a significant advantage over the conventional lamp, to reduce the brightness of the LEDs only when there is an increase in the part R corresponding to the portion of the light generated by LED 114.

In particular, in the case of a user walking at night on the road and coming to cross the headlights of a motor vehicle, the control system will be able to determine that the light from these lamps is part of the ambient light, and therefore, refrain from reducing the brightness of the LEDs despite the increase in M2 measure.

Figure 4A:
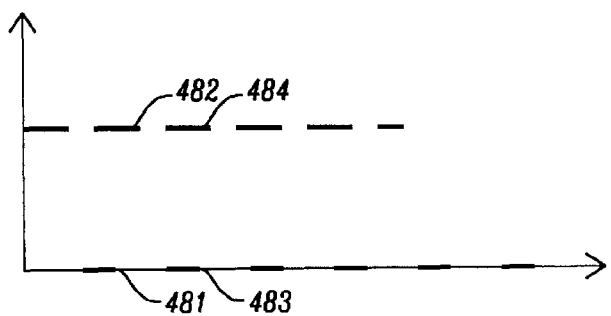
FIGS. 4a and 4b illustrates two alternative embodiments of the regulation mechanism.
Figure 4B:
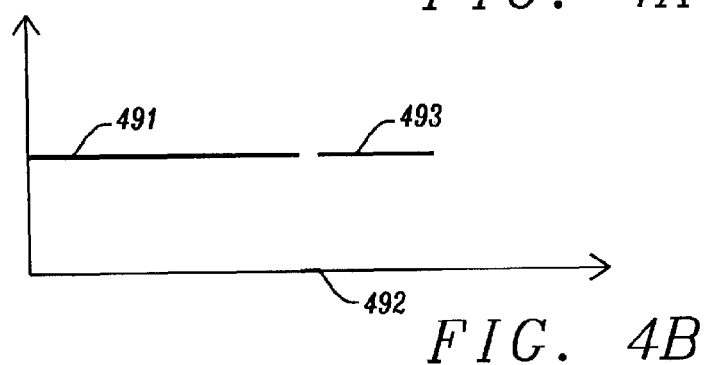

FIG. 4a more particularly illustrates the operation of a control mechanism suitable for the pulse width modulation. The timing diagram (representing time in abscissa and brightness) shows indeed a pulse width modulation having alternating phases of switch-on of the lamp (482, 483. . . ) and switch-off (481, 483), which respective durations allow the setting of the duty cycle and, therefore, the average brightness value.

According to an embodiment, the control unit 125 activates the measures M1 described above during the switch-off phases 481, 483 etc. . . and measures M2 during the switch-on phases 482, 484. . . . These measurements can then be treated in diverse ways, statistical or otherwise, so as to collect a variety of data that can serve for the regulation.

If one powers the LED by means of analog circuitry generating continuous currents ("buck" or "boost" converters), it will then be possible to consider the use of a regulation mechanism closer to that shown in Figure B where one can see that the DC powering of the LED corresponds to a series of phases 491, 493 . . . which are interspersed with brief switch-off phases 492 so as to arrange measurements M1.

Different variants are possible, clearly.

As it can be seen on these first examples, one can significantly improve the knowledge and the "response" of the reflective ambient environment and thus deduce a more appropriate regulation strategy.

2. Description of a Second Embodiment (One Photo Sensor—Two Beams, Respectively Wide and Narrow)

It will now be described in relation to FIG. 5, a second embodiment of a headlamp having one single photo sensor 290, but used for the generation of two light beams generated by the LEDs 403 and 401, respectively narrow and wide.

The lamp 500 includes a power unit 510 comprising a power source, such as a battery (not shown in the figure), which generates a supply voltage Vcc, and two power switches, respectively 521 and 522, for the powering in current of LED diodes 403 and 401, and respectively controlled by circuits 131 and 132, implementing the s PWM modulation. Switches 521 and 522 are for instance of the type semiconductor such as a bipolar transistor, an FET (Field Effect Transistor) or MOS (Metal Oxide Semiconductor) or MOSFET.

Both circuits 521 and 522 are respectively controlled by the control information or to control signals 513 and 514 generated by integrated control unit 240 integrated within control unit 520.

This is only one illustrative embodiment, and a skilled man may clearly use other examples of architecture, and in particular by grouping both circuits 521 and 522 within a same electronic circuit.

Figure 5:
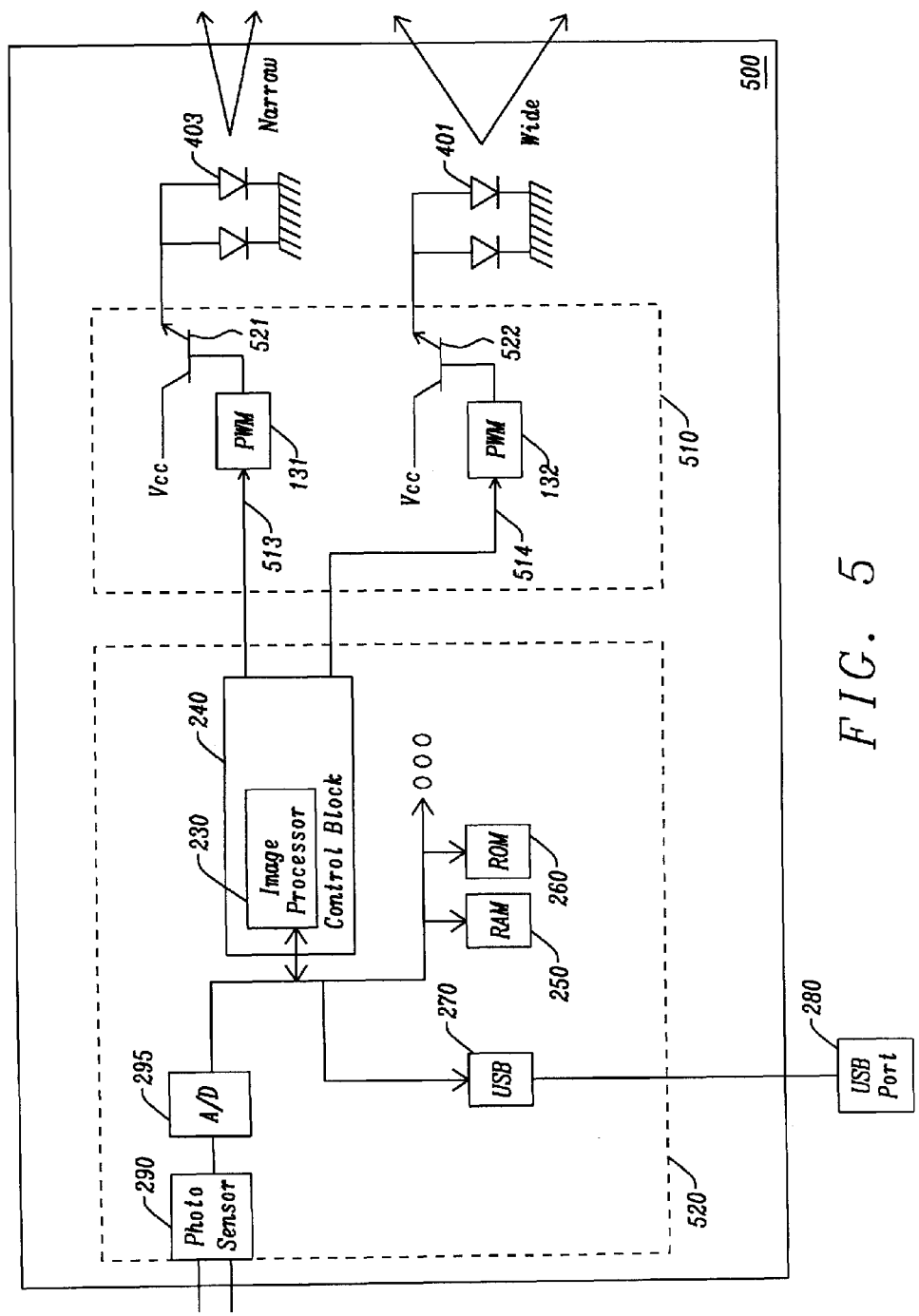
FIG. 5 illustrates a second embodiment based on the combination of one single photo sensor with two beams, respectively wide and narrow.

Still in reference to FIG. 5, the control unit 240 incorporates a processor 230 which communication via conventional address, data and control bus with RAM memory 250, ROM or EEPROM memory 260 etc. . . .

Photo sensor 290 is combined to an analog-to-digital converter 295 which allows the conversion into a digital information of the analog signals generated by the sensor, which digital information can then be made available to processor 230 via the data and address busses etc. . . .

In a preferred embodiment, the image capture sensor has an axis which corresponds to the axis of the LEDs so that the image sensed by capture sensor 210, coincides with the area illuminated by the latter.

In another embodiment, a USB port 280 is accessible via a USB module 270 which is included in the control unit and connected to the bus, allowing the exchange of data according to the USB standard. Specifically, the USB interface will allow, as this will be seen below, the storage of settings parameters and profiles within the lamp.

In this way, the control unit can communicate with a data processing device such as a computer, a laptop, a touch pad, a personal assistant and even a smartphone It should be noted that the USB port is only one illustrative example of a means for achieving communication between the lamp and a computer, and a skilled person may consider any other communication means, including wireless communication means (Bluetooth, wifi etc . . . ). In one particular embodiment, the headlamp will be arranged with its own IP (Internet Protocol) address so as to allow easy configuration, for instance through a dedicated web server.

Such communication is particularly advantageous, for instance for exchanging configuration data and settings, such as "profiles" that can serve for storing and selecting, as necessary, the settings of the lamp in accordance with the desired use wished by its owner, and especially settings for implementing the illustrative functional diagrams which will be described below. Alternatively or additionally, the "profiles" can be used, as described below, for executing specific procedures or modes, such as the so-called static mode (wherein the regulation process is deactivated as well as the possible control of the geometry of the beam) and the dynamic mode (wherein the regulation process is fully operational).

Figure 6:
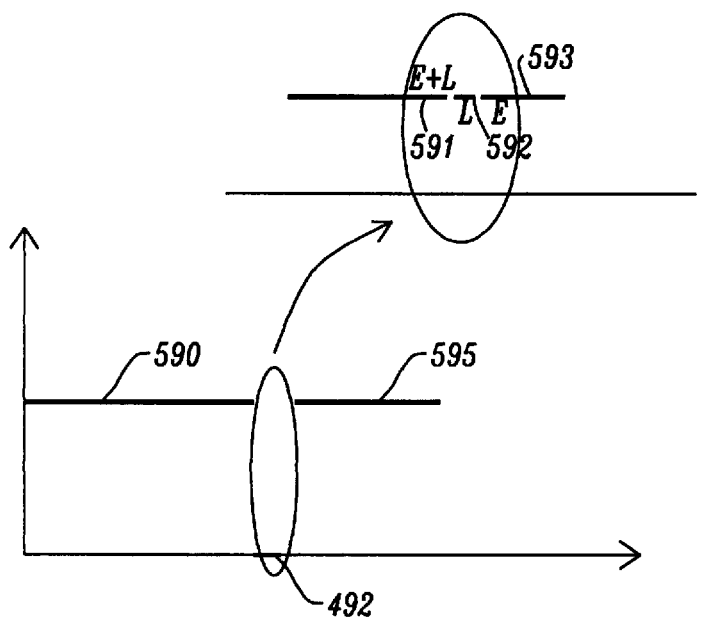
FIG. 6 shows a chronograph illustrates of the operating of the regulation device of the lamp of FIG. 5.

One will now more specifically describe, in connection to FIG. 6, the operation of the architecture described above which achieves particularly useful regulation of the transmission power of the LED.

In particular, the timing diagram in FIG. 6 illustrates operation of the lamp in which, for example, the LEDs 401 and 403 are powered by a DC current, which value is determined by means of adequate converting circuits (buck and/or boost) during phases 590 and 595.

Periodically, for example every two milliseconds, the powering in DC current of LED diodes 401 and 403 is interrupted by a phase of measurements of diversity (represented in the figure by the ellipse), which phase comprises, as it can be seen on the upper right part of the figure, a succession of three steps:

Step 1 (591): both LEDs 401 and 403 are both powered, thus allowing a first measurement M1 being the response of the reflective ambient light under the joint illumination of the two beams, together with the ambient light;

Step 2 (592): the narrow beam is switched-off so as to allow a second measurement M2 being the response of the reflective ambient light under the illumination of the sole Wide beam, together with the ambient light;

Step 3 (593): The Wide beam is switched off so as to allow a third measurement M3 being the response of the reflective ambient light under the illumination of the sole narrow beam, together with the ambient light.

If one denotes by the variables L and E respective luminosities of wide and narrow beams, and $L_{ambient}$ ambient light, we can write:

$M1 = L_{ambient} + L + E$ $M2 = L_{ambient} + L$ $M3 = L_{ambient} + E$

Which finally results in:

$L_{ambient} = M2 + M3 - M1$ but also $L = M1 - M3$ $E = M1 - M2$

Or $L = M2 - L_{ambient}$ and $E = M3 - L_{ambient}$

As shown in this embodiment, it is not necessary to turn off simultaneously together the two beams to easily evaluate the portion of the ambient light within the response of the photo sensor.

This is a significant advantage of this embodiment.

As for the other embodiment, various control or regulation strategies can be considered:

In particular, one may decide, in a configuration settings corresponding to one particular profile, that the regulation mechanism will regulate the powering in current of the LED only one variables L and E so as to reduce any possible disturbance affecting the exterior sources of lights forming the outside environment. Thus, if the "feedback" of the lamp has not changed but an external disturbance has occurred, is the regulatory mechanism can discriminate such external disturbance as not being part of the feedback (L, E) beams generated by the lamp so as to maintain, as a consequence, the powering of LED diodes.

These strategies can also be advantageously combined with "profiles" type settings, configured using the USB port 280 of FIG. 5.

For example, In a first configuration corresponding to an activity called "jogging/walking" for example, the processor 230 will maintain a constant brightness based on regulation even if the lamp holder comes to cross the lights of a vehicle from the opposite direction.

Alternatively, in a second mode configuration corresponding for example to a caving activity, one may decide instead that the control mechanism applied by the processor 230 will give lower importance to L and/or E values so as to avoid disturbances resulting from the passage of the rope in front of the photo sensor.

In a particular embodiment, strong variations in the response yield by values L and/or E can be detected by the regulation mechanism as being representative of a situation of climbing activity, and may then lead to the de activation of the regulation, to provide constant brightness to the climber until it is hoisted to the top of the rope.

Clearly, any other strategy is possible, from the simpler to the more sophisticated one, based on the combination of the different variables L, E and L ambient resulting resulting from the diversity measurements performed during phases 591-593.

3. Description of a Third Embodiment (One Photo Sensor—Two Unaligned Beams)

It is now be described with reference to FIG. 7, a third embodiment in which the power unit 510 of FIG. 5 is used for powering a set of two diodes 501 and 503 (only one being shown for each diode beam) having slightly different axes. The two sets of diodes 501-503 are powered through the power unit 110, respectively via leads 502 and 504 under control of control unit 520.

Figure 7:
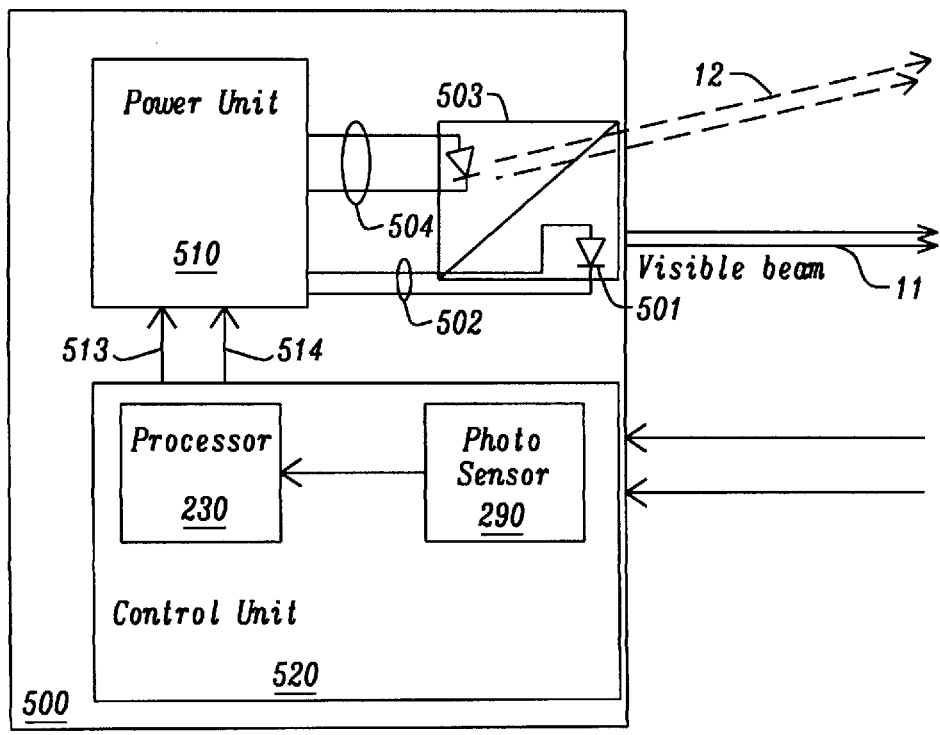
FIG. 7 is a third embodiment illustrates a lamp having two misaligned sensors.

If FIG. 7 illustrates one embodiment with only two series diodes and hence only two separate axes 11 and 12, it is clear that a man skilled in the art I can adapt the invention so as to produce a number of light beams and a number of axes being superior than two.

In the embodiment that is illustrated, it should be observed that control unit 520 generates two control information or control signals, respectively, 513 and 514, for the purpose of controlling the power emitted by the corresponding series of LEDs, ie LED 501 and 503.

From a dynamic point of view, as above for the first two embodiments which were described, control circuit (ie the processor 230) controls a phase of extinction or switch-off of one of the two beams for a duration which is not visible for the lamp holder so as to capture the specific response of photo sensor 290 during this extinction phase.

In this way, the microprocessor controlled by an appropriate set of program instructions, can collect several measures of diversity on a single reflective ambient environment for the purpose of refine the regulation process of the lamp.

4. Description of a Fourth Embodiment (One Photo Sensor—One Modulation Light Beam)

Figure 8:
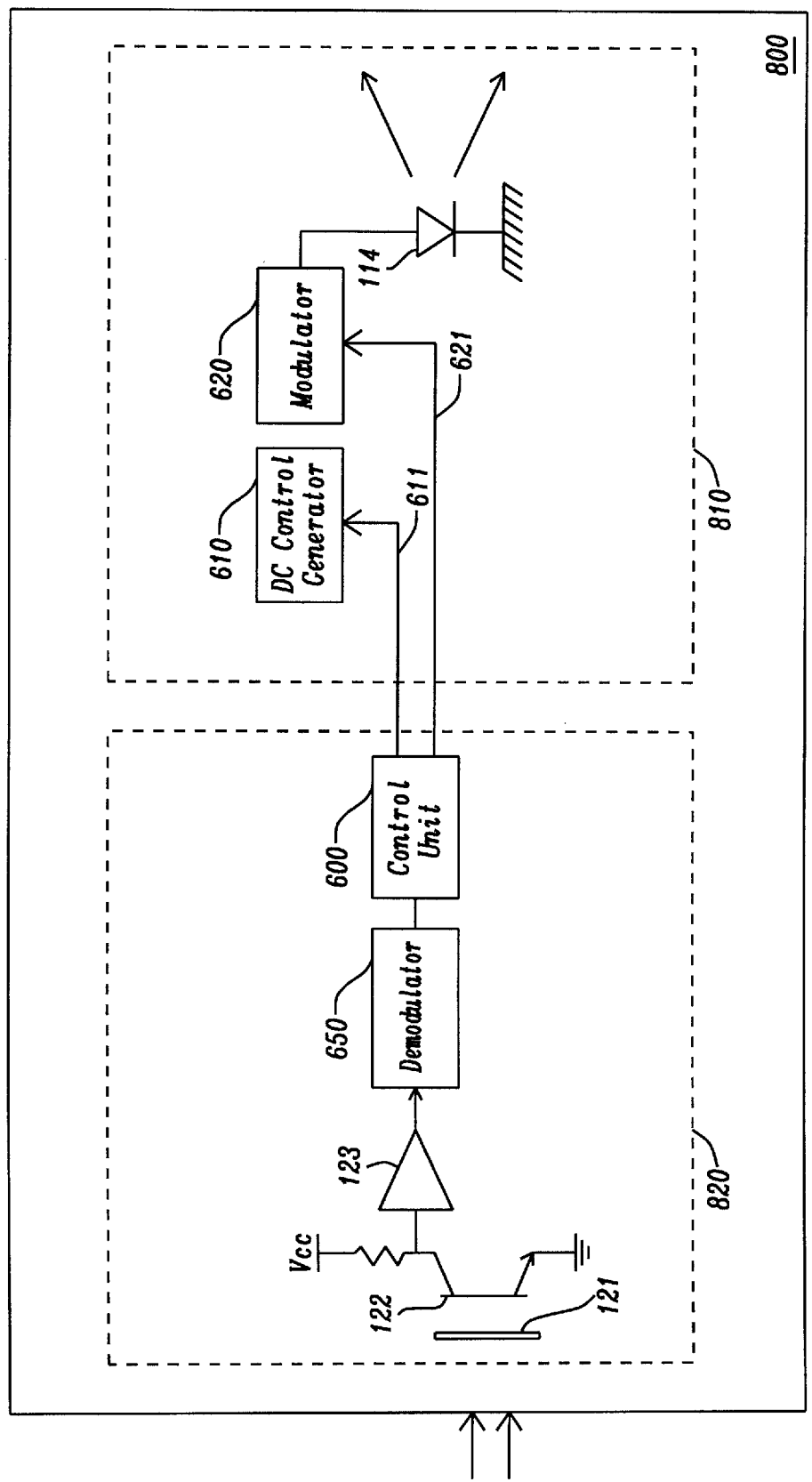
FIG. 8 illustrates a fourth embodiment comprising a generator for a modulated beam.

It will now be described with reference to FIG. 8, a fourth embodiment that differs from the first embodiment in that the beam generated by the diode 114 (elements in common with those of FIG. 1 will keep their references) is modulated by means of a modulation information so as to allow the sensor 121 to capture a complex signal which enriches the diversity of the information which is collected for the purpose of discriminating more easily different light sources, in particular the modulated light source generated by the portable lamp 800, and thus improving the regulation system of that lamp.

For this purpose, power unit 110 of FIG. 2 is replaced by a block 810 including a DC current generator 610 controlled by a first control signal 611 and a modulator 620 receiving a modulation information on a circuit 621.

The DC current generator 610 can be realized by means of any analog electronic circuitry achieving power conversion, and in particular using appropriate converters ("buck" or "boost", as applicable) to convert the voltage of a battery in a variable direct current controlled by the information conveyed by circuit 611.

For its part, modulator 620 can be any type of modulator, and in particular a amplitude or frequency modulator, achieving the addition of an alternating component to a DC current (at a frequency being high enough for not being noticeable to the human eye), according to modulation data.

One may also consider any other type of modulation.

For its part, the control unit 120 is replaced by a block 820 that includes, in addition to the photo sensor 121, optics element 122, a signal amplifier 123, a demodulator 650 for demodulating the luminous flux sensed by the photo sensor and extracting the modulation information. A control unit 660 can then use those diverse pieces of information for deriving any appropriate regulation strategy of the current used for powering the LED.

Clearly, one can also use the modulation in the case of a plurality of beams, as in the second embodiment showing a narrow beam and a wide beam. In this particular situation, one can modulate the particular narrow beam with a first modulation information and the wide beam with a second modulation information to enable the photo sensor to collect both information channels and thus allow easier discrimination. Modulation may also be used, when appropriate, for establishing a communication channel between the two lamps, particularly when those lamps are more or less facing each other.

As before, diverse and various control strategies can be considered.

Advantages of the Invention

Thanks to the diversity of measures which are operated during the selective extinction or switch-off phase, the control or regulation mechanism can be made more efficient.

It is thus possible to widen the cone of the photo sensor so as to enable it to incorporate the advantage of the ambient and feedback portion of the light beams.

This is an important advantage over conventional dynamic lighting which required the use of a sensor having a relatively narrow cone so as to avoid, for example, to be too easily disturbed by car lights facing the lamp holder.

It should be noticed that the measurements of diversity can be performed, not only at the level of brightness as described above with previous examples, but also with respect to the contrast.

It was thus observed the following advantages resulting from the use of the invention:
  greater robustness of the control mechanism against any disturbing noisy sources of lighting;
  the possibility of expanding the field of vision of the sensor, which is made possible by improved discrimination between the light sources thanks to the diversity measurements, and therefore,
  less phenomena of "pumping" associated with changes in the ambient lighting (typically a flashing light, passing in front of a grid)

Thanks to the increase of the field of vision, the reduction of the phenomenon related to the bright object (like a tool) which might inadvertently reduce illumination;

Less sensitivity to disruptions due to small surface objects (eg rope).

What is claimed is:

1. A portable lamp comprising: a light source comprising one or more sources for generating at least two light beams, comprising a narrow beam and a wide beam; a power unit for controlling the brightness of said at least two beams in response to control information or a control signal; a control unit for the purpose of generating said control information or said control signal; wherein said control unit comprises at least a photo sensor and a regulation unit controlling a switch-off phase of one or more beams during a period not visible to the holder of the lamp, said switch off phase being combined with at least one measure of diversity made by means of said photo sensor(s) on the reflective ambient environment wherein said regulation unit periodically performs: a switch off of said narrow beam, combined with a first measure performed by said photo sensor(s); a switch off of said wide beam, combined with a second measure performed by said photo sensor(s).

2. Portable lamp according to claim 1 further comprising one single photo sensor.

3. Portable lamp according to claim 2, wherein said wide and narrow beams are, respectively generated by at least a first LED and a second LED.

4. Portable lamp according to claim 1 wherein said regulation circuit performs the computation of the ambient light in accordance with the following formula:

$$L_{ambient}=M2+M3-M1$$

With

M1 being a measure performed when both beams are on;

M2 being a measure performed during the switch-off of the Narrow beam;

M3 being a measure performed during the switch-off of the Wide beam.

5. Portable lamp according to claim 4 wherein said regulation circuit adjusts the power of the light beam in accordance with the values L=M1−M3 and E=M1−M2, at the exclusion of the ambient light; wherein variables L and E represent respective luminosities of wide and narrow beams, and $L_{ambient}$ ambient light, with:

$$M1=L_{ambient}+L+E$$

$$M2=L_{ambient}+L$$

$$M3=L_{ambient}+E.$$

6. Portable lamp according to claim 4 wherein said regulation circuit adjusts the power of the light beam in accordance to the sole value $L_{ambient}$.

7. Portable lamp according to claim 1 further comprising at least two unaligned beams.

8. Portable lamp according to claim 1 further comprising configuration means, according to one or more predetermined profiles, said configuration being performed by means of a communication port of the type USB port allowing communication with a computer, a touch pad or a smartphone.

9. Portable lamp according to claim 1 wherein a powering current of said light source is modulated in order to convey a modulation information.

10. Portable lamp according to claim 1 wherein the portable lamp is a headlamp.

11. A method of providing a portable lamp comprising the steps of:

providing a light source comprising one or more sources for generating at least two light beams, comprising a narrow beam and a wide beam; providing a power unit for controlling the brightness of said at least two beams in response to a control information or a control signal; providing a control unit for the purpose of generating said control information or said control signal; wherein said control unit comprises at least a photo sensor and a regulation circuit controlling a switch-off phase of one or more beams during a period not visible to the holder of the lamp, said switch off phase being combined with at least one measure of diversity made by means of said photo sensor(s) on the reflective ambient environment wherein said regulation circuit periodically performs: a switch off of said narrow beam, combined with a first measure performed by said photo sensor(s); a switch off of said wide beam, combined with a second measure performed by said photo sensor(s).

12. The method of providing a portable lamp according to claim 11 further comprising one single photo sensor.

13. The method of providing a portable lamp according to claim 12, wherein said wide and narrow beams are, respectively generated by at least a first LED and a second LED.

14. The method of providing a portable lamp according to claim 11 wherein said regulation circuit performs the computation of the ambient light in accordance with the following formula:

$$L_{ambient}=M2+M3-M1$$

With M1 being a measure performed when both beams are on;

M2 being a measure performed during the switch-off of the Narrow beam;

M3 being a measure performed during the switch-off of the Wide beam.

15. The method of providing a portable lamp according to claim 14 wherein said regulation circuit adjusts the power of the light beam in accordance with the values L=M1−M3 and E=M1−M2, at the exclusion of the ambient light; wherein variables L and E represent respective luminosities of wide and narrow beams, and $L_{ambient}$ ambient light, with:

$$M1=L_{ambient}+L+E$$

$$M2=L_{ambient}+L$$

$$M3=L_{ambient}+E.$$

16. The method of providing a portable lamp according to claim 14 wherein said regulation circuit adjusts the power of the light beam in accordance to the sole value $L_{ambient}$.

17. The method of providing a portable lamp according to claim 11 further comprising at least two unaligned beams.

18. The method of providing a portable lamp according to claim 11 further comprising configuration means, according to one or more predetermined profiles, said configuration being performed by means of a communication port of the type USB port allowing communication with a computer, a touch pad or a smartphone.

19. The method of providing a portable lamp according to claim 11 wherein a powering current of said light source is modulated in order to convey a modulation information.

20. The method of providing a portable lamp according to claim 11 wherein the portable lamp is a headlamp.

* * * * *